April 5, 1927.

W. E. RAWLINGS

ANT TRAP

Filed Sept. 7, 1926

1,623,439

INVENTOR

William E. Rawlings
John A. Naismith

ATTORNEY

Patented Apr. 5, 1927.

1,623,439

UNITED STATES PATENT OFFICE.

WILLIAM EDWARD RAWLINGS, OF SANTA CLARA COUNTY, CALIFORNIA.

ANT TRAP.

Application filed September 7, 1926. Serial No. 134,089.

It is the object of the present invention to provide a trap so constructed and arranged as to effectually lure the ants into a compartment or receptacle from which they cannot escape.

In the drawing:—

Figure 1:
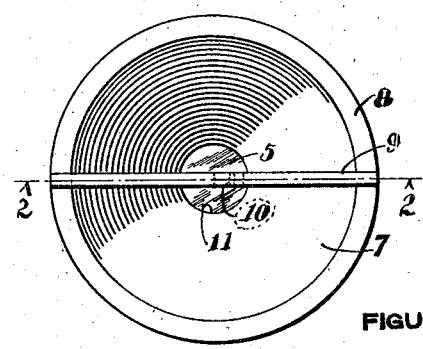
Figure 1 is a plan view of one embodiment of my invention.
Figure 3:
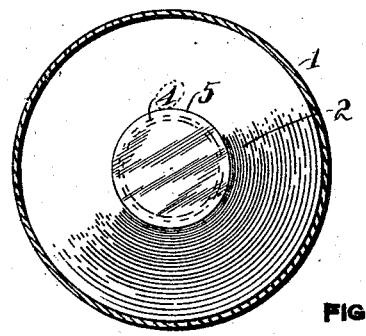
Figure 3 is a sectional view on line 3—3 of Figure 2.
Figure 2:
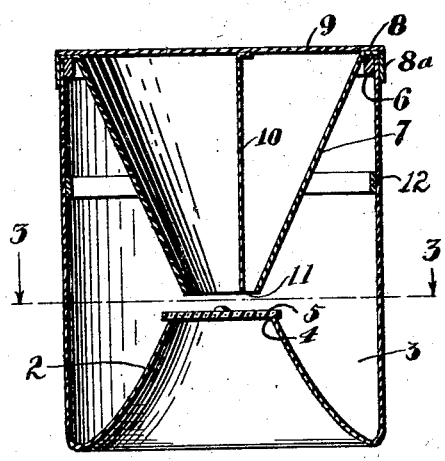
Figure 2 is a sectional view on line 2—2 of Figure 1.

Referring more particularly to the drawing, I show at 1 a tubular body portion having its lower end formed into a reentrant truncated conical portion as indicated at 2, thereby forming an inner chamber 3. On the flat upper edge 4 of this conical bottom portion 2 is mounted a small mirror 5 with its reflecting surface facing upwardly.

Inserted in the upper end of the tubular body 1 is a movable ring 6. This ring 6 is fitted snugly in the body 1 in order to be frictionally held in whatever position it may be placed.

At 7 I show a hollow truncated conical element arranged in an inverted position in the tubular body portion 1, its base being formed into an outwardly extending flange 8 which is in turn turned downwardly in parallel relation to the axis of the element 7 and adapted to engage the upper edge of the body 1. When in position the flange 8 rests on the adjustable ring 6 as shown.

A supporting strap is shown at 9 extending diametrically across the element 7, and to this strap 9 is attached a ribbon 10 in such a manner as to depend therefrom with its free end falling within the circle of the open truncated end of the element 7, this end of the element being indicated by the reference numeral 11.

A strip of adhesive tape is shown at 12 mounted upon the inner wall of the body 1 and completely encircling the same. This tape is of the type wherein both faces are adhesive and therefore provides an effective bar against the passage of ants.

When the trap has been constructed as hereinbefore described it is assembled with the end 11 of the element 7 spaced approximately one-eighth of an inch from the reflecting surface of the mirror 5. This spacing may be adjusted to meet requirements by raising or lowering the ring 6 in body 1.

Assuming the device to have been assembled and placed in a locality infested with ants and with, perhaps a bit of ant lure such as a drop of syrup placed upon the center of the mirror as shown.

As the ants move about over the device they descend to the end 11 of part 7 and there are attracted by the lure on the mirror 5. This, together with the reflection of the ant in the mirror induces it to descend upon the mirror. Its only field of movement is now within the chamber 3 because it is prevented from travelling out of the chamber by the strip 12 and by its inability to ascend from the surface of the mirror to the edge 11 on element 7.

The depending strip 10 offers another mode of approaching the mirror and one that is somewhat nearer the lure than the edge 11.

It is desirable in order to set the trap properly, to place a bridge from the end 11 to the mirror surface. After the ants have located the lure and have established communication with it, then the bridge may be removed. Even after its removal, however, the ants continue to descend into the trap as described. When the trap has been in place for some time the ants therein may be destroyed in any suitable manner.

It is to be understood, of course, that while I have herein shown and described but one specific embodiment of the invention, changes in form, construction, and method of operation may be made within the scope of the appended claims.

I claim:—

1. An ant trap comprising a chamber having a mirror mounted therein, means providing a path of travel for ants suspended in opposed and spaced relation to the reflecting surface of said mirror but closely approaching the same, the gap so formed being adapted to permit the passage of ants thereover and means for closing off all other paths of travel to and from said chamber.

2. An ant trap comprising a chamber having an elevated mirror mounted therein, a ring adjustably mounted in the upper end of said chamber, means providing a path of travel for ants suspended from said ring to a point approaching but not touching said mirror, and means for preventing the passage of ants from said chamber by travelling up its side walls.

WILLIAM EDWARD RAWLINGS.